United States Patent [19]

Ichihara

[11] Patent Number: 4,866,615

[45] Date of Patent: Sep. 12, 1989

[54] SCINTILLATION CAMERA COMPENSATION FOR SHIFTING THE CENTER CHANNEL OF THE ENERGY SPECTRUM DUE TO PHOTOMULTIPLIER GAIN CHANGE

[75] Inventor: Takashi Ichihara, Ootawara, Japan

[73] Assignee: Kabushiki Kaisha Toshiba, Kawasaki, Japan

[21] Appl. No.: 898,232

[22] Filed: Aug. 20, 1986

[30] Foreign Application Priority Data

Aug. 21, 1985 [JP] Japan ................. 60-181852

[51] Int. Cl.$^4$ ..................... G01T 1/208; G01T 1/164
[52] U.S. Cl. ..................... 364/413.24; 364/571.04; 250/252.1; 250/369; 250/363.07; 378/207
[58] Field of Search ............. 364/414, 571; 378/207; 250/252.1, 363 S, 369

[56] References Cited

U.S. PATENT DOCUMENTS

| 4,047,034 | 9/1977 | Auphan | 250/363 R X |
| 4,223,221 | 9/1980 | Gambini et al. | 250/363 S |
| 4,323,977 | 4/1982 | Arseneau | 364/414 X |
| 4,517,460 | 5/1985 | Meulenbrugge et al. | 250/252.1 |
| 4,577,338 | 3/1986 | Takahashi et al. | 378/207 X |
| 4,583,187 | 4/1986 | Stoub | 250/363 S X |
| 4,611,283 | 9/1986 | Lumelsky et al. | 364/414 |

Primary Examiner—Jerry Smith
Assistant Examiner—Clark A. Jablon
Attorney, Agent, or Firm—Finnegan, Henderson, Farabow, Garrett & Dunner

[57] ABSTRACT

A scintillation camera apparatus includes a scintillation camera which generates X and Y position signals representing a detection position of gamma rays radiated from an object to be examined and a Z signal representing the energy level of the gamma rays, and an image memory for storing data indicating the detection frequency of the Z signal having an energy exceeding a predetermined level at a location accessed by the X and Y position signals. A first compensation table for compensating for the nonlinearity of the X and Y position signals and a second compensation table for the Z signal are provided for compensating for the X, Y, and Z signals to be supplied to the image memory. For compensating a change with time in gains of the photomultipliers, a data memory is provided for storing an energy spectrum of gamma rays in a real time manner. The peak valve position of the energy spectrum is calculated based on the data stored in the data memory. If the peak valve position changes, the content of the second compensation table is rewritten in accordance with the shifting of the peak valve position of the energy spectrum.

3 Claims, 4 Drawing Sheets

SCINTILLATION CAMERA COMPENSATION FOR SHIFTING THE CENTER CHANNEL OF THE ENERGY SPECTRUM DUE TO PHOTOMULTIPLIER GAIN CHANGE

BACKGROUND OF THE INVENTION

The present invention relates to a scintillation camera apparatus for obtaining a scintigram of a living body into which a gamma-emitting radio isotope (RI) is injected.

Medical equipment which utilizes a scintillation camera is popular. In this type of equipment, the distribution of gamma rays radiated from an object to be examined, into which a radio isotope is applied, is detected for diagnosis of the object. A scintillation camera comprises a collimator, a scintillator, and photomultipliers arranged in a matrix form. Gamma rays radiated from an object to be examined bombard the scintillator through the collimator to generate fluorescent light. The fluorescent light is incident on the respective photomultipliers which produce electrical signals proportional to the intensity of the incident gamma rays. The electrical signals are supplied to an electronic circuit comprising a position calculation circuit, an addition circuit, and the like, thus generating position signals X and Y representing the detection position of the gamma rays and an energy signal Z representing the intensity of the gamma rays. The detection frequency of the energy signal Z whose magnitude is within a certain range (window) is stored in an image memory for each detection position, and data in the image memory is read out to a display device having a cathode ray tube (CRT) display to display the scintigram of the object. Due to its structural limitations, the scintillation camera is inevitably subject to errors caused by the nonlinearity of radiation detection positions and energy detection errors caused by variations in gains of the photomultipliers. For this reason, at the manufacturing stage of the scintillation camera apparatus, it is essential to compensate for the nonlinearity of the detection positions (i.e., position signals X and Y) and variations in energy detection response (i.e., energy signal Z), in order to obtain accurate scintigrams.

For example, the characteristics of the scintillation camera are measured using a uniform radiation source to prepare a nonlinearity compensation table (i.e., an X-Y compensation table) which stores compensation vectors for compensating for the nonlinearity of the detection positions and an energy detection sensitivity compensation table (i.e., a Z compensation table) for compensating for variations in energy detection response at pixel positions of the camera. In actual diagnosis of the object, position signals X and Y and energy signal Z obtained from the scintillation camera are corrected by compensation data read out from the correction tables comprised of random access memories (RAMs) accessed by these signals.

However, a change in gain characteristics of the photomultipliers with passage of time (i.e., a change in peak values of Z signal) is inevitable. When such a change with time in gain occurs, the initially prepared Z compensation table becomes useless. For this reason, an operator is required to update the Z compensation table at intervals of a constant time in accordance with the current gain characteristics of the photomultipliers. This operation is complicated and time consuming.

SUMMARY OF THE INVENTION

It is an object of the present invention to provide an improved scintillation camera apparatus.

It is another object of the present invention to provide a scintillation camera apparatus which is free from the necessity of rewriting a correction table even if a change with time in gain characteristics of photomultipliers in a scintillation camera occurs.

According to the present invention, there is provided a scintillation camera apparatus comprising scintillation camera means, having a two-dimensional radiation detector, for detecting gamma rays radiated from the interior of an object to be examined, into which a radio isotope is injected, to produce X and Y position signals representing a detection position of gamma rays and a Z signal representing the intensity of gamma rays for each detection position, image memory means, coupled to said scintillation camera means, for storing data indicating a detection frequency of gamma rays exceeding a predetermined energy level at a memory location addressed by the X and Y position signals when the Z signal exceeds the predetermined energy level and providing image data representing a distribution of the radio isotope in the object, first compensation table means for storing compensation data for compensating for nonlinearity of the X and Y position signals, said first compensation table means being accessed by the X and Y position signals from said scintillation camera means to read out corresponding X and Y compensation data therefrom, second compensation table means for storing energy compensation data corresponding to an energy detection response for gamma rays of said scintillation camera means, said second compensation table means being accessed by the Z signal from said scintillation camera means to read out corresponding Z compensation data therefrom, compensation means coupled between said scintillation camera means and said image memory means, and responsive to the X, Y, Z compensation data from said first and second compensation tables for compensating the X and Y position signals and the Z signal to be supplied from said scintillation camera means to said image memory means, energy spectrum data memory means, coupled to said scintillation camera means, for storing an energy spectrum of gamma rays, energy spectrum center-of-gravity detecting means, coupled to said energy spectrum data memory means, for detecting the center of gravity of energy distribution, and rewriting means, coupled to said energy spectrum data memory means and said second compensation table means, for, when a current center-of-gravity position detected by said energy spectrum center-of-gravity detecting means is shifted from a previously detected center-of-gravity position, forming energy compensation data in accordance a shifting amount between the center-of-gravity positions, and rewriting said second compensation table means.

DETAILED DESCRIPTION OF THE PREFERRED EMBODIMENT

Figure 1:
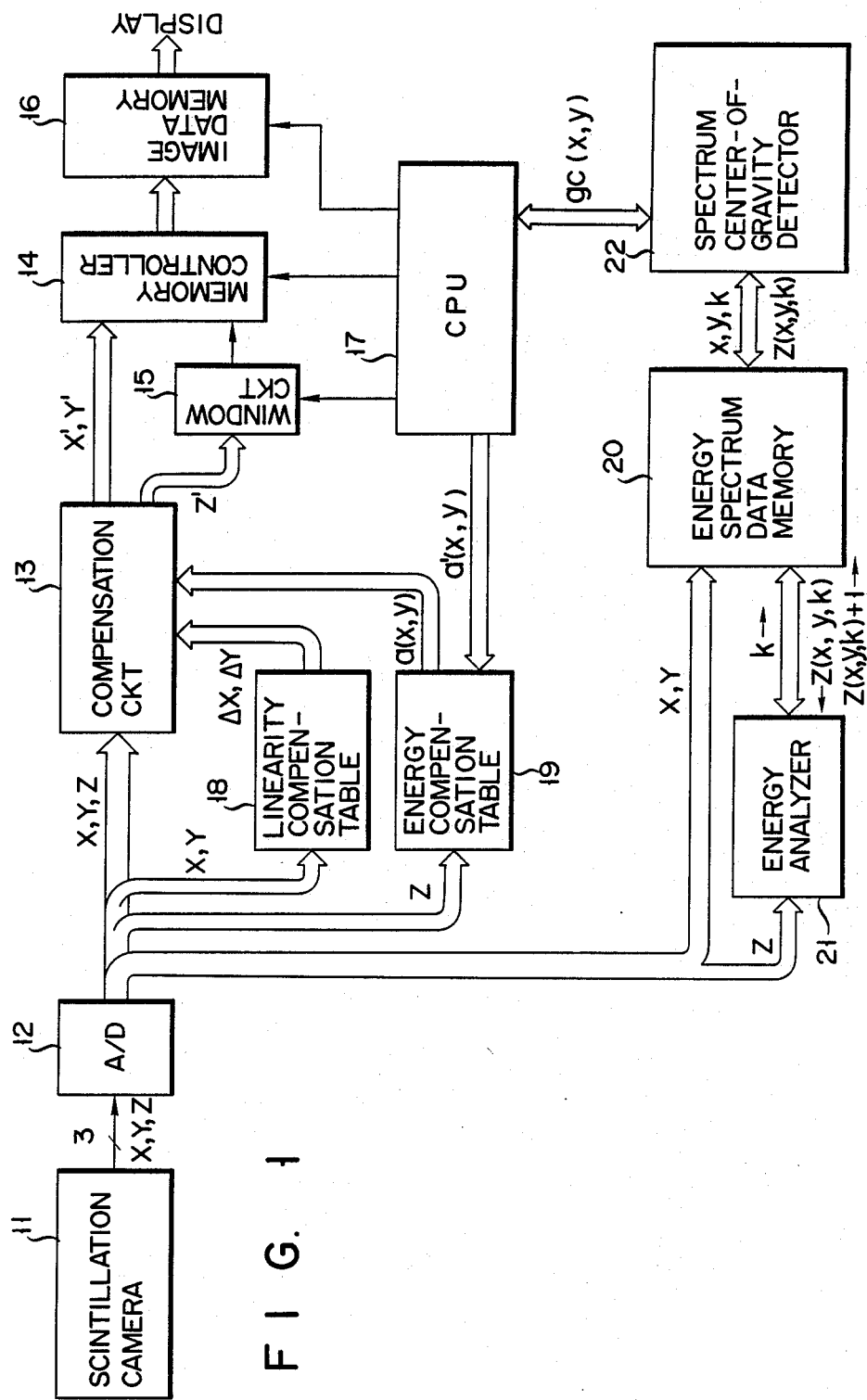
FIG. 1 is a block diagram of a scintillation camera apparatus according to one embodiment of the present invention.

Referring to FIG. 1, position signals X and Y representing detection positions of gamma rays and an energy signal Z representing the intensity of the gamma rays are obtained in an analog form from a scintillation camera 11 having a known configuration. Signals X, Y, and Z are applied to corresponding analog-to-digital (A/D) converters 12 to be converted to 12-bit digital signals. Digital signals X, Y, and Z are applied to a compensation circuit 13 for the nonlinearity and sensitivity to produce compensated signals X', Y', and Z', as will be described later.

Signals X' and Y' are applied to a memory controller 14 and signal Z' is applied to a window circuit 15. Window circuit 15 issues a write command to memory controller 14 only when input signal Z' represents an energy level within a predetermined range. Memory controller 14 applies position signals X' and Y' to an image data memory 16 as address signals in response to application of the write command thereto, and increments, by unity, data in a memory location in the memory designated by address signals X' and Y'. This means that data indicating the detection frequency of gamma rays exceeding a predetermined level (i.e., scintigram data) is stored at memory locations corresponding to the respective pixel positions on the detection surface of scintillation camera 11. The scintigram data is read out from image data memory 16 to a display device (not shown) for observing the scintigram of the object. Memory controller 14, window circuit 15, and image data memory 16 are controlled by a central processing unit (CPU) 17 in the same manner as in existing systems.

Position signals X and Y from A/D converters 12 are applied to a linearity compensation table (RAM) 18 as address signals so that compensation data ΔX and ΔY stored in advance for linearity compensation are read out therefrom. Energy signal Z from A/D converter 12 is applied as an address signal to a Z compensation table (RAM) 19 to read out energy detection response compensation data a(x,y) obtained from a measurement and previously stored therein. Compensation data ΔX, ΔY, and a(x,y) read out from RAMs 18 and 19 are applied to compensation circuit 13 to correct signals X, Y, and Z in accordance with predetermined compensation calculations (to be described later) and to form compensated signals X', Y', and Z'.

The compensation calculations are made as follows:

$$X' = X + \Delta X$$
$$Y' = Y + \Delta Y \quad (1)$$
$$Z' = a(x,y) \times Z$$

ΔX and ΔY are expressed by $$\Delta X = a0 X + b0 Y + c0 X \cdot Y + d0$$
$$\Delta Y = a1 X + b1 Y + c1 X \cdot Y + d1$$

Where a0, a1, b0, b1, c0, c1, d0, and d1 are constants determined by X and Y.

The above-mentioned compensation method of position signals X and Y and energy signal Z is well known to those skilled in the art.

The main feature of the present invention resides in monitoring the energy spectrum of energy signal Z at all times, and rewriting compensation coefficients a(x,y) of RAM 19 when a center position (channel) of the energy spectrum is shifted.

To this end, according to this invention, a memory 20 which is accessed by position signals X and Y and stores energy spectrum data, and an energy analyzer 21 for analyzing the energy of signal Z are provided.

Figure 2:
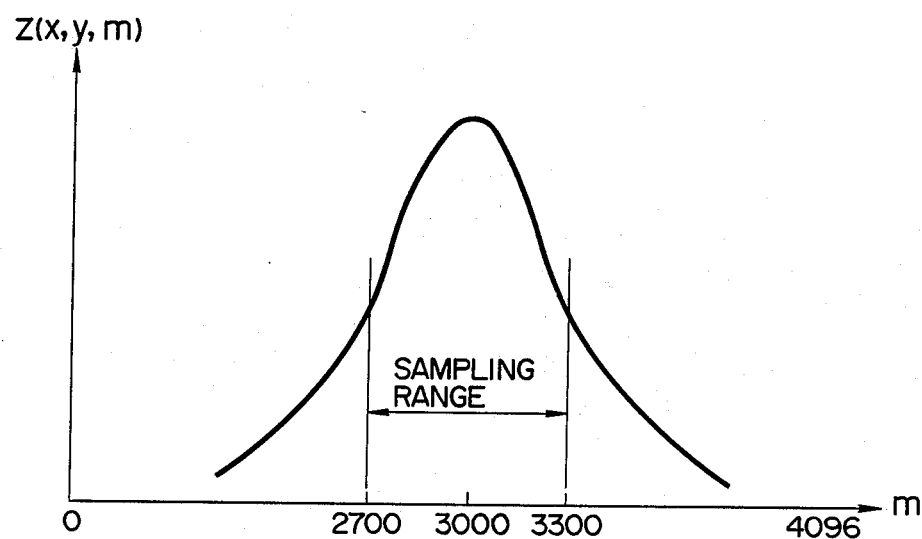
FIG. 2 is a graph showing an energy spectrum of gamma rays.
Figure 3:
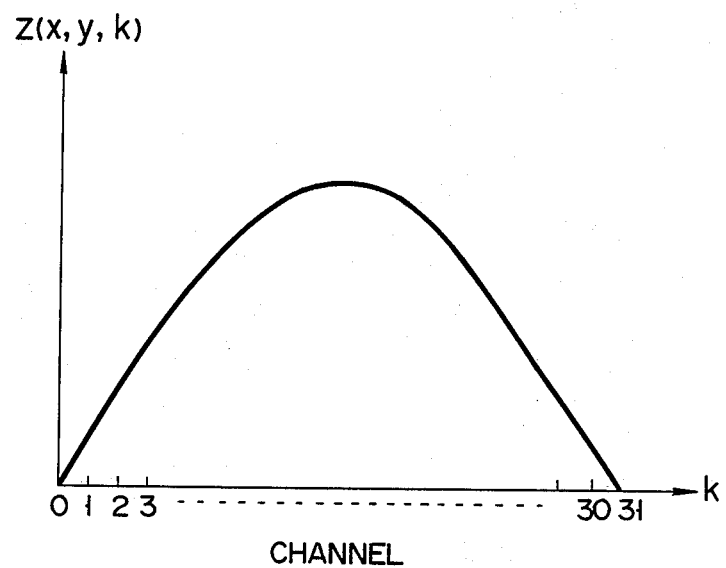
FIG. 3 is a graph for explaining the operation of an energy analyzer.

FIG. 2 shows energy spectrum Z(x,y,m) of signal Z. In FIG. 2, the abscissa represents value m of signal Z, which ranges from 0 to 4096 since signal Z is a 12-bit signal. In this embodiment, the energy analysis is made with respect to the ±10% range of a central value (peak value) of the spectrum. Energy analyzer 21 samples the energy spectrum of the ±10% range into, for example, 0 to 31 channels, as shown in FIG. 3, and k represents the channels. Energy analyzer 21 generates a 5-bit output signal k representing one of 32 channels in response to 12-bit input signal Z. Output signal k of analyzer 21 is applied to energy spectrum memory 20 as an address signal together with position signals X and Y.

Figure 4:
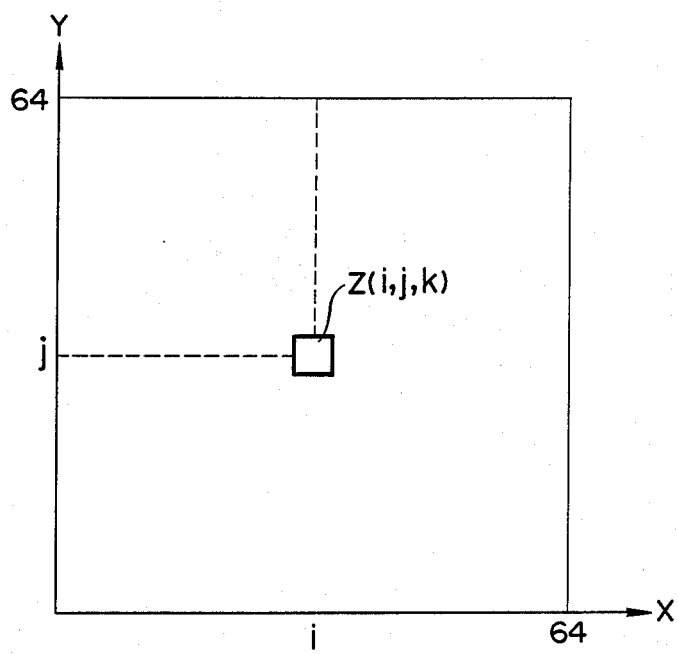
FIG. 4 is a representation for explaining energy spectrum data.
Figure 5:
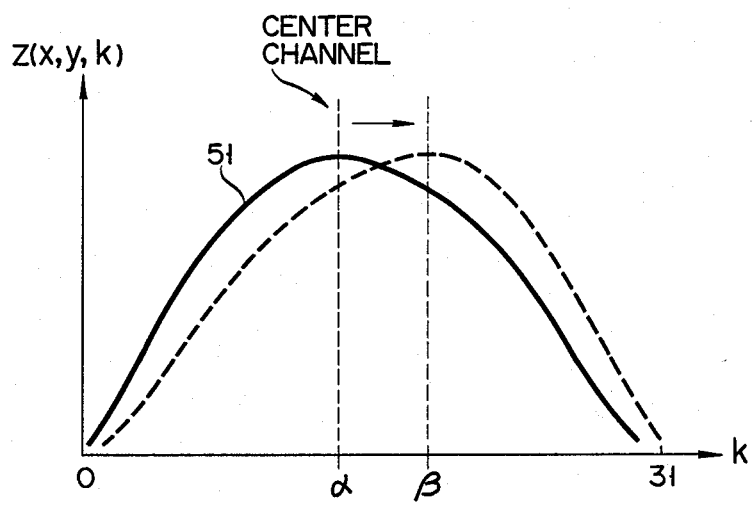
FIG. 5 is a graph for explaining the shifting of the center of gravity of the energy spectrum due to a change in the scintillation camera with time.

Memory 20 has 64×64 matrix storage areas of a two-dimensional plane defined by position signals X and Y, as shown in FIG. 4. The 64×64 storage areas defined by signals X and Y each include storage subareas corresponding to the 32 channels of signal Z. Therefore, memory 20 has 60×60×32 memory locations, in each of which is stored data Z(i,j,k) with i=x and j=y. Z(i,j,k) represents the energy detection frequency of gamma rays, corresponding to k, stored in the kth channel of a memory area defined by signals X and Y. Energy analyzer 21 issues address data k as well as address data X and Y to energy spectrum memory 20 to read out data Z(x,y,k) therefrom, and returns data Z(x,y,k)+1 in the same memory location accessed by address data X, Y, and k. As a result, data representing energy spectrum as indicated by a solid curve 51 in FIG. 5 is stored in 32 channels of a memory area defined by X=i and Y=j. A center channel indicating the peak value of the energy spectrum is indicated by α.

An energy spectrum peak detector 22 is provided which is coupled to memory 20, and detects a peak value (the center) of the energy spectrum distribution, on the two-dimensional plane defined by the X and Y coordinates, stored in memory 20. As described previously, when a change in gains of the photomultipliers with passage of time occurs, the center channel of the energy spectrum distribution may change from α to β, as shown in FIG. 5. This would cause a change in the center (i.e., peak value) of the energy spectrum. Such a change requires a correction of the Z compensation table.

Detector 22 detects the center the of energy spectrum distribution and supplies peak value data to CPU 17. CPU 17 calculates compensation coefficient a'(x,y) from the shifting of the center of the energy spectrum distribution resulting from the shifting of the center channel as shown in FIG. 5, and corrects Z compensation table 19. For this reason, the necessity of a working of correcting RAM 19 is obviated regardless of a change with time in gains of the photomultipliers.

Figure 6:
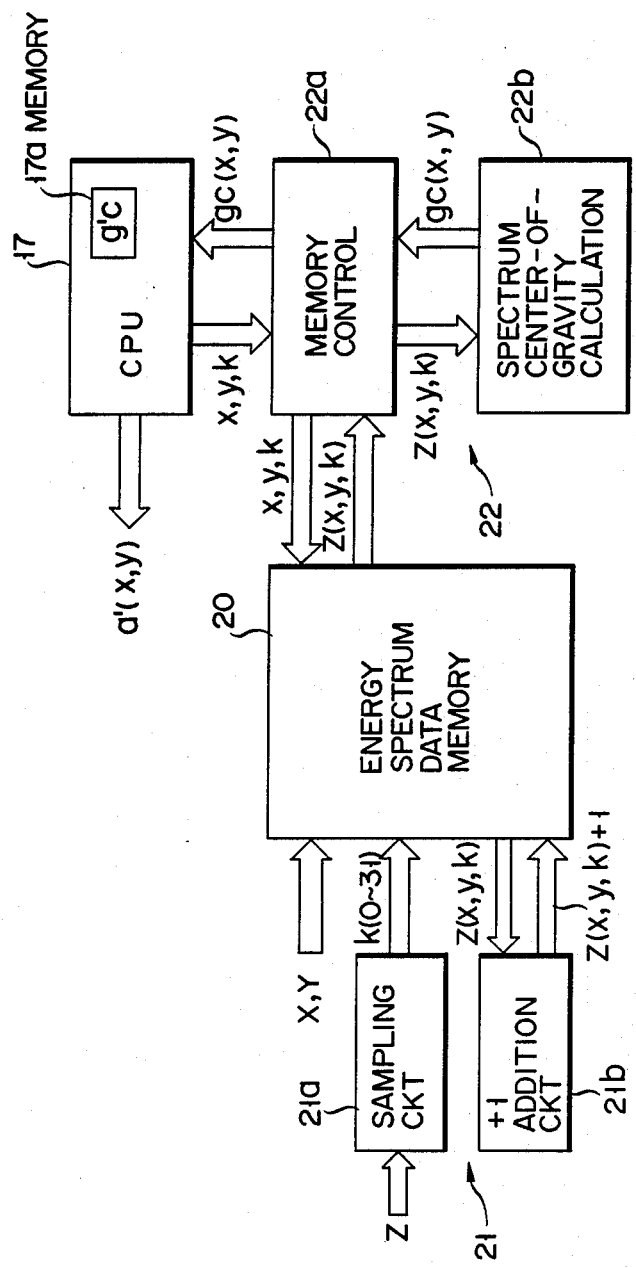
FIG. 6 is a block diagram of the energy analyzer and a spectrum peak (center-of-gravity) detector.

FIG. 6 shows energy analyzer 21 and energy-spectrum peak detector 22 in detail. Energy analyzer 21 comprises a sampling circuit 21a and an addition circuit 21b. As described previously, sampling circuit 21a receives signal Z which may have a value from 0 to 4096 and divides a range from 2700 to 3300 centered at 3000 into 0 to 31 channels. The output signal indicating one of 0 to 31 channels is supplied to memory 20 as an address signal. As a result, data Z(x,y,k), which represents the energy detection frequency in the kth channel, is read out from the memory location accessed by address data X, Y, and k to addition circuit 21b, and is incremented by one so that data Z(x,y,z)+1 is returned to the same location of memory 20. This means the count of energy detection frequency in the kt channel at a position defined by position signals X and Y.

Energy spectrum peak detector 22 comprises emory control circuit 22a and spectrum peak value calculation circuit 22b. Memory control circuit 22a receives address data X, Y, and k from CPU 17, supplies them to memory 20, and then receives data Z(x,y,k) therefrom. Circuit 22a supplies data Z(x,y,k) read out from memory 20 to calculation circuit 22b. Circuit 22b calculates the peak value of gc of energy spectrum distribution as follows:

$$gc(x,y) = \sum_{k=1}^{32} k \times Z(x,y,k) / \sum_{k=1}^{32} Z(x,y,k)$$

Peak value data gc thus calculated is supplied to CPU 17 through control circuit 22a. CPU 17 incorporates an internal memory 17a, which stores previously calculated peak value data gc'(x,y). When the shifting of the center of the energy spectrum distribution occurs, CPU 17 calculates new compensation coefficient data a'(x,y) from the following expression:

$$a'(x,y) = a(x,y) \times (gc/gc')$$

CPU 17 rewrites RAM 19 in accordance with the thus calculated compensation data. In this manner, even if a change with time in gains of photomultipliers occurs, since the Z compensation table can be automatically rewritten, precise scintigram data of an object to be examined can always be stored in image data memory 22.

During the above-mentioned compensation operation, if the shifting of the center of the energy spectrum is too large to be compensated for, the CPU may be arranged to produce an alarm to an operator without performing the compensation operation.

What is claimed is:

1. A scintillation camera apparatus comprising:
   scintillation camera means, having a two-dimensional radiation detector, for detecting gamma rays radiated from the interior of an object to be examined, into which a radio isotope is injected, to produce X and Y position signals representing a detection position of gamma rays and a Z signal representing the intensity of gamma rays for each detection position;
   image memory means, coupled to said scintillation camera means, for storing data indicating a detection frequency of gamma rays exceeding a predetermined energy level at a memory location addressed by the X and Y position signals when the Z signal exceeds the predetermined energy level and for providing image data representing a distribution of the radio isotope in the object;
   first compensation table means for storing compensation data for compensating for nonlinearity of the X and Y position signals, said first compensation table means being accessed by the X and Y position signals from said scintillation camera means to read out corresponding X and Y compensation data therefrom;
   second compensation table means for storing energy compensation data corresponding to an energy detection response for gamma rays of said scintillation camera means, said second compensation table means being accessed by the Z signal from said scintillation camera means to read out corresponding Z compensation data therefrom;
   compensation means coupled between said scintillation camera means and said image memory means, and responsive to the X, Y, Z compensation data from said first and second compensation tables for compensating the X and Y position signals and the Z signal to be supplied from said scintillation camera means to said image memory means;
   energy spectrum data memory means, coupled to said scintillation camera means, for storing an energy spectrum of gamma rays;
   energy spectrum peak detecting means, coupled to said energy spectrum data memory means, for detecting the peak value of the energy spectrum distribution; and
   rewriting means, coupled to said energy spectrum data memory means and said second compensation table means, for, when a current peak value position detected by said energy spectrum peak detecting means is shifted from a previously detected peak value position, forming energy compensation data in accordance with a shifting amount between said peak value positions, and rewriting said second compensation table means in accordance with the energy compensation data.

2. An apparatus according to claim 1, wherein said energy spectrum data memory means comprises energy analyzer means connected to receive the Z signal from said scintillation camera means for dividing a predetermined range of levels of the Z signal into a plurality of channels to produce a channel signal representing a channel corresponding to the level of the Z signal;
   a data memory which is accessed by the X and Y position signals from said scintillation camera means and the channel signal from said energy analyzer means to read out data at the accessed location therefrom;
   and means, coupled to said data memory, for incrementing the data at the location accessed by the X and Y position signals and the channel signal by one,
   and wherein said energy spectrum peak detecting means is arranged to calculate a peak value position gc of the energy spectrum based on data stored in said data memory.

3. An apparatus according to claim 2, wherein said energy spectrum peak detecting means is arranged to calculate the peak value position gc of the energy spectrum as follows:

$$gc = \sum_{k=1}^{m} k \times Z(x,y,k) / \sum_{k=1}^{m} Z(x,y,k)$$

where k is a channel number provided from said energy analyzer means, Z(x,y,k) is data accessed by the X and Y position signals and the channel signal from said energy analyzer means and stored in said data memory, and m is the number of channels.

* * * * *

UNITED STATES PATENT AND TRADEMARK OFFICE
CERTIFICATE OF CORRECTION

PATENT NO. : 4,866,615
DATED      : September 12, 1989
INVENTOR(S) : Takashi Ichihara It is certified that error appears in the above-identified patent and that said Letters Patent is hereby corrected as shown below:

Title page:

In the Abstract, lines 17, 19, and 21, change "valve" to --value--

Signed and Sealed this

Sixth Day of August, 1991

Attest:

HARRY F. MANBECK, JR.

*Attesting Officer*    Commissioner of Patents and Trademarks